United States Patent
Dusan

(10) Patent No.: US 10,896,682 B1
(45) Date of Patent: Jan. 19, 2021

(54) SPEAKER RECOGNITION BASED ON AN INSIDE MICROPHONE OF A HEADPHONE

(71) Applicant: Apple Inc., Cupertino, CA (US)

(72) Inventor: Sorin V. Dusan, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/168,677

(22) Filed: Oct. 23, 2018

Related U.S. Application Data

(63) Continuation of application No. 15/672,663, filed on Aug. 9, 2017, now abandoned.

(51) Int. Cl.
  G10L 17/00 (2013.01)
  G10L 17/04 (2013.01)
  H04R 1/08 (2006.01)
  G10L 15/08 (2006.01)
  H04R 1/10 (2006.01)

(52) U.S. Cl.
  CPC ............. *G10L 17/04* (2013.01); *G10L 15/08* (2013.01); *G10L 17/00* (2013.01); *H04R 1/083* (2013.01); *H04R 1/1016* (2013.01)

(58) Field of Classification Search
  None
  See application file for complete search history.

(56) References Cited

U.S. PATENT DOCUMENTS

| | | | |
|---|---|---|---|
| 6,411,930 B1 * | 6/2002 | Burges | G10L 17/04 704/236 |
| 9,633,652 B2 * | 4/2017 | Kurniawati | G10L 15/144 |
| 2003/0046068 A1 * | 3/2003 | Perronnin | G10L 15/07 704/220 |
| 2007/0230734 A1 * | 10/2007 | Beard | H04R 1/04 381/361 |
| 2010/0114572 A1 * | 5/2010 | Tani | G10L 17/08 704/247 |
| 2014/0037101 A1 * | 2/2014 | Murata | H04R 3/00 381/74 |
| 2014/0195232 A1 * | 7/2014 | Kurniawati | G10L 17/04 704/245 |
| 2014/0236593 A1 * | 8/2014 | Wu | G10L 15/14 704/231 |
| 2016/0232920 A1 * | 8/2016 | Matheja | H04R 3/005 |
| 2017/0178668 A1 * | 6/2017 | Kar | G10L 17/02 |
| 2017/0214997 A1 * | 7/2017 | Kaller | H04M 1/6008 |
| 2018/0113673 A1 * | 4/2018 | Sheynblat | G10L 17/00 |
| 2018/0144736 A1 * | 5/2018 | Huang | G10K 11/17879 |

(Continued)

OTHER PUBLICATIONS

Derawi, Mohammad, et al., "Biometric Acoustic Ear Recognition", Biometric Security and Privacy, (Dec. 1, 2016), 71-120.

(Continued)

*Primary Examiner* — Abul K Azad
(74) *Attorney, Agent, or Firm* — Womble Bond Dickinson (US) LLP

(57) ABSTRACT

A speaker recognition algorithm is trained (one or more of its models are tuned) with samples of a microphone signal produced by an inside microphone of a headphone, while the headphone is worn by a speaker. The trained speaker recognition algorithm then tests other samples of the inside microphone signal and produces multiple speaker identification scores for its given models, or a single speaker verification likelihood score for a single given model. Other embodiments are also described and claimed.

31 Claims, 7 Drawing Sheets

(56) References Cited

U.S. PATENT DOCUMENTS

2018/0268798 A1\* 9/2018 Mustiere ............... G10K 11/16
2018/0277123 A1\* 9/2018 Boesen .................. G06F 3/017

OTHER PUBLICATIONS

"NEC develops biometrics technology that uses sound to distinguish individually unique ear cavity shape", Retrieved from the Internet <http://www.nec.com/en/press/201603/global_21060307_01.html>, (Mar. 7, 2016), 3 pages.

Bramer, Anthony J., et al., "Understanding speech when wearing communication headsets and hearing protectors with subband processing", The Journal of Acoustical Society of America, vol. 136, Issue 2, (May 30, 2014), 671-681.

Hurley, D. J., et al., "The Ear as a Biometric", 15th European Signal Processing Conference (EUSIPCO 2007), (Sep. 3, 2007), 25-29.

\* cited by examiner

SPEAKER RECOGNITION BASED ON AN INSIDE MICROPHONE OF A HEADPHONE

This application is a continuation of pending U.S. patent application Ser. No. 15/672,663, filed Aug. 9, 2017.

FIELD

An embodiment of the invention relates to digital signal processing techniques for identification or verification of a person who is wearing a headset, a headphone, or is using a mobile phone handset.

BACKGROUND

A digital signal processing technique has been reported that tries to automatically verify whether or not a person who is wearing an earbud (an in-ear headphone) is the registered owner of the headphone, and not an imposter. While the owner is wearing the earbud, a white noise signal is played through the acoustic output transducer of the headphone while the output of an inside microphone of the headphone is being recorded. The recorded audio signal is then used for computing a transfer function, between i) the input to the acoustic output transducer and ii) the output of the inside microphone. This transfer function is expected to be unique to each person who wears the earbud, as it represents the characteristics of the ear canal of the wearer. The technique then uses a pattern recognition process to determine whether or not a newly computed transfer function matches the stored transfer function of the owner of the headphone.

Biometric speaker recognition of a person may also be performed when the person is wearing a headset that has an outside microphone for example a boom microphone close to the mouth of the user or a regular microphone on a headset, both of which have an outside opening to capture the user's speech. During a training phase, the outside microphone is used to record speech from the user (wearer) of the headset, while the user is speaking a particular phrase as in text-dependent speaker recognition, or any phrase as in text-independent speaker recognition. A recording of speech from the user repeating the phrase several times is used to train a machine learning-based speaker recognition algorithm. Once trained, the algorithm can process a new speech recording from the outside microphone to compute a likelihood that the new speech recorded is that of the user of the headset; if this likelihood is above a predetermined threshold then it is used to conclude the speech is that of the user.

SUMMARY

An embodiment of the invention is a method for speaker recognition using a microphone signal that is produced by an inside acoustic microphone of a headphone worn by a user. This inside microphone may be what is commonly referred to as the "error microphone" that is also used for other purposes such as acoustic noise cancellation or active noise control (ANC). The headphone has an inside acoustic microphone and one or more outside acoustic microphones. While a particular user wearing the headphone is speaking, a first microphone signal is produced by the inside acoustic microphone, and a second microphone signal is produced by the outside acoustic microphone, both of which are simultaneously capturing the user's speech. A speaker recognition algorithm is trained with a (speech) sample of the first microphone signal, not the second microphone signal, as an input to the algorithm to create an "owner model" for that particular user. The algorithm being trained is instructed to consider the sample as representing an utterance or phrase spoken by the particular user, e.g., a registered owner of the headphone or of an audio device, such as a smartphone, to which the headphone is connected as an accessory. Thus, in contrast to exciting the ear canal with white noise and then computing the transfer function of the ear canal at the inside microphone, the wearer's speech as recorded using the inside microphone is applied as an input to train a model of speech production that may be used by a speaker recognition algorithm. The model not only reflects the characteristics of the user's vocal and nasal tracts as an outside microphone would do, but also reflects the characteristics of the user's ear canal by employing the inside microphone. Note how the first microphone signal may exhibit i) characteristics of the vocal and nasal tracts, ii) characteristics of the ear canal, and iii) speech bone conduction transmission characteristics, of a wearer of the headphone, the second microphone signal may exhibit only i), not ii) and not iii).

The method continues with performing a speaker recognition algorithm that uses the trained model (owner model) of the user, to test another speech sample from the inside microphone signal (as input to the algorithm). The sample contains an utterance or phrase, which might be that of an imposter rather than the particular user. The test phase produces a speaker identification likelihood score or a speaker verification likelihood score for that sample, as against (using) the owner model. During experimentation, the method has been proven to have a better equal error rate (EER) than a similar method which differed only in that it used the outside microphone of the same headphone, instead of the inside microphone, to collect (pick up) the user's speech.

It should be appreciated that when the headphone is one that is acoustically leaky, e.g., a loose-fitting earbud, an earbud with acoustic vents, a hearing aid, or a personal sound amplifier, the user's speech as picked up by the inside microphone has been modulated by the vocal tract and nasal tracts of the user and transmitted to the inside microphone through two paths, i) through bone conduction and ii) through an acoustic path that runs from the mouth and nostrils past the leaky headphone. Both of those paths may be unique to the particular user and thus contribute to the uniqueness of the model that has been generated for the particular user. In addition, while the user's speech (as picked up by the inside microphone) is also modulated by the ear canal, the method does not need to compute the transfer function of the ear canal by playing a sound in the user's ear. Lastly, the speech signal picked up by the inside microphone is more immune to ambient acoustic noise, as compared to when an outside microphone is being used to collect the users speech, which also increases the accuracy of the speaker recognition algorithm in noisy environments.

The training phase of the method described above is applicable to produce the "speech input" for a variety of types of speaker recognition algorithms. Such an algorithm may be, e.g., Maximum Likelihood Gaussian Mixture Model, Deep Neural Network, Artificial Neural Network, etc. Each of these algorithms may contain a training phase as described above, used for building the users speech pickup model, and a test phase during which a new sample of the inside microphone signal is processed by the algorithm to compute an identification likelihood score or a recognition likelihood score. The algorithm used may be text-dependent where it is trained to recognize patterns or features of a specific phrase or utterance, e.g., "How is the weather today?" or it may be text-independent where it is trained to recognize features that may be in any phrase or utterance.

The speaker recognition method may be performed either on an electronic audio device that is paired to the headphone (the latter as an accessory) or it may be performed entirely by a programmed processor that is integrated in the headphone, and as such there is no need to access the digital computing resources of an external audio device to which the headphone may be connected as an accessory in order to execute the method. The processor in the headphone may then signal the paired electronic audio device to "unlock" or wake-up, in response to the speaker recognition method having identified or verified the wearer of the headphone.

It should be noted that the method described above may also be performed when the "the headphone" is a mobile phone handset (cellular phone or smartphone), in which the inside microphone is one that shares the same acoustic port as the earpiece speaker or receiver of the mobile phone handset, which acoustic port is pressed against the users ear during use. Accordingly, the term "headphone" as used here should be understood to also encompass a mobile phone handset or other head worn device that, when it is "worn" by its user (placed against the users ear), acoustically occludes the ear and therefore forms an acoustic cavity that extends to the user's ear drum.

A second embodiment of the invention is a method for speaker recognition that uses a ratio, in frequency domain, of i) a sample of the user's speech as picked up by the inside acoustic microphone and ii) a sample of the user's speech as picked up simultaneously by the outside microphone, of the headphone that is worn by the user. Thus, in contrast to the embodiment described above where the outside microphone signals are not used to produce a speech input feature of the speaker recognition algorithm, in the second embodiment the method generates a feature vector that contains the difference (delta) between the inside and outside microphone signals, for example as the logarithm of the ratio of the power spectra of the user's speech as picked up simultaneously by the inside microphone and by the outside microphone. Each component of such a vector may be a ratio computed at a respective frequency bin. To do so, each of the two microphone signals may be first transformed from time domain to frequency domain, using a Fast Fourier Transform (e.g., Short Term Fourier Transform) or other methods such as filter bank analysis. Then, the power spectra of the inside microphone signal is divided by the power spectra of the outside microphone signal, on a per frequency bin basis. A logarithm is taken of the resulting ratio (for each frequency bin.) A scaling factor (e.g., a constant) is then applied (on a per frequency bin basis) to result in the raw form of the input feature vector for the speaker recognition (identification or verification) algorithm. In one embodiment, a subsequent process is applied to the raw form of the feature vector, for dimensionality reduction at the input to the speaker recognition algorithm. Such a process may employ a Principal Component Analysis (PCA) technique, a Linear Discriminant Analysis (LDA), and the like. Either the raw feature vector or the reduced dimensionality feature vector can be used as the input for the training phase of the desired speaker recognition algorithm, and subsequently during the test phase.

Note that most if not all of the variations described above in connection with the first embodiment in which the outside microphone signals are not used to train or test the speaker recognition algorithm) are also applicable to the second embodiment (in which a ratio of the inside microphone to one of the outside microphones is used, to compute the input to train or test the speaker recognition algorithm.) Examples include the different types of the headphone 2 (e.g., in-ear earbud, over the ear earphone, mobile phone handset, etc.) Also, various speaker recognition algorithms can be employed for the second embodiment, as in the case of the first embodiment (e.g., maximum likelihood Gaussian mixture model, artificial neural network, deep neural network, etc.)

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, in the interest of conciseness and reducing the total number of figures, a given figure may be used to illustrate the features of more than one embodiment of the invention, and not all elements in the figure may be required for a given embodiment.

DETAILED DESCRIPTION

Several embodiments of the invention with reference to the appended drawings are now explained. Whenever the shapes, relative positions and other aspects of the parts described in the embodiments are not explicitly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1A:
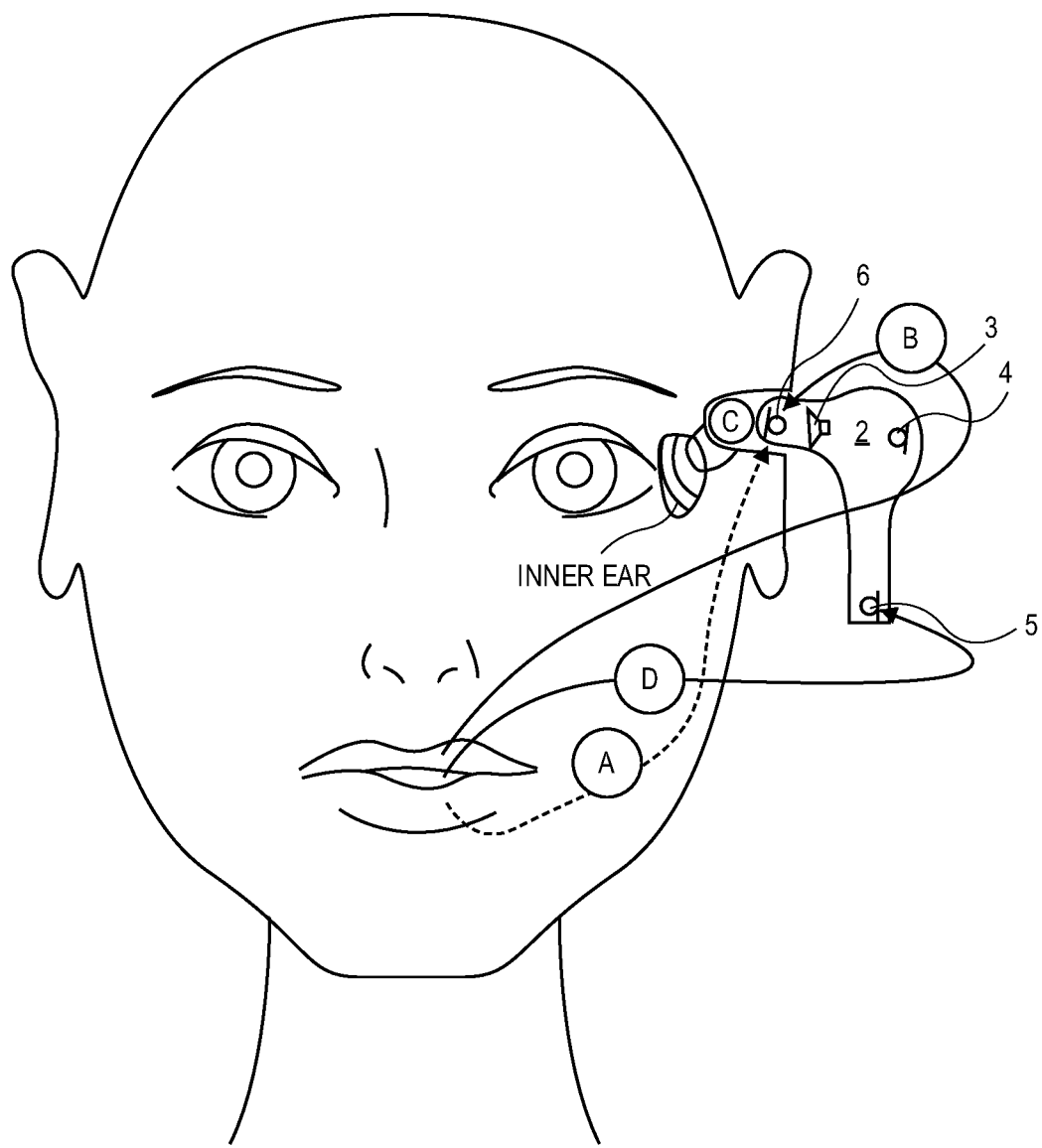
FIG. 1a depicts a user wearing an in-ear earbud in her ear.

FIG. 1a depicts a user or wearer wearing a headphone 2 in her ear. The headphone 2 has a housing in which a sound output transducer 3 is integrated, that is driven by an audio playback signal. The audio playback signal may be a downlink communications signal containing a far-end user's voice during a telephony call or it may be a streaming audio signal from a server being accessed over the Internet. The audio playback signal may be received into the housing of the headphone 2 from an external audio source (not shown), such as a smartphone or a tablet computer that is running a telephony or media player app. The connection to the external audio source may be wired or it may be wireless, connected either via a digital communications cable or a wireless digital link (e.g., a Bluetooth link). In another embodiment, the headphone 2 may have integrated within its housing a wireless transceiver that can receive an audio file, via for example a wireless local area network link, where the downloaded file is then locally stored and locally decoded into the audio playback audio within memory inside the housing of the headphone 2. Although depicted in the figure as an earbud that is worn in-ear, the term "headphone" (the headphone 2) is used more generally here, and may refer to any head-worn personal listening device, such as an on-the-ear or an over-the-ear earphone, a hearing aid, a personal sound amplifier (PSAP), a headset, or even a mobile phone handset. Furthermore, the example shows that the headphone 2 as worn could only partially acoustically seal (also referred to as loose-fitting or leaky) the ear canal of the user; alternatively, it could fully acoustically seal the ear canal to increase passive suppression of ambient sound.

Also integrated within the housing of the headphone 2 is an inside microphone 6 and one or more outside microphones 4, 5. The inside microphone 6 is described here as "facing" the wearer's eardrum and physically oriented or packaged in such a way that, as described in more detail below, it is sensing the user's speech (sound) simultaneously through three pathways: 1) directly from the vocal and nasal tract through bone conduction, labeled A in the figure; 2) from the vocal and nasal tract and then outside the headphone housing and then into the ear due to the leaky design of the headphone 2, labeled B; and 3) within an ear cavity that is formed between the eardrum and the headphone housing, labeled C. Note that the ear cavity is partially occluded by the headphone housing, which in this particular example lies inside the ear due to the headphone 2 being an in-ear earbud. The inside microphone 6 is positioned and oriented so that its primary acoustic input port is directly open to the ear cavity (while the latter is at least partially occluded by the housing of the headphone 2 as the headphone 2 is being worn by its user.) The inside microphone 6 may be the microphone that produces the well known "error signal" that is used by an acoustic noise cancellation or active noise control (ANC) subsystem for a headphone.

The headphone 2 also has integrated therein a reference outside microphone 4 and a talker outside microphone 5. The reference outside microphone 4 is oriented and packaged in such a way that favors its sensing of the ambient sound rather than the sound within the ear cavity; this microphone may be the one that produces the well-known "reference signal" used by the ANC subsystem. As to the outside talker microphone 5, it is oriented in such a way that favors its sensing of the wearer's voice that emerges from the mouth (as shown by the D line), rather than the sound within the ear cavity. This may be achieved by for example positioning the talker microphone 5 at the tip of a microphone boom or, in as shown in figure, at the end of an elongated extension of the headphone housing. An outside microphone may be an acoustic microphone that is positioned and oriented so that its primary acoustic input port is not directly open to the ear cavity (while the latter is at least partially occluded by the housing of the headphone 2 as the headphone is being worn by its user.) The signals produced by the inside and outside microphones are synchronized and they capture the same speech of the user (wearer) albeit through different pathways (as further explained below.) Although two outside microphones are shown in the figure, the headphone 2 may have a single outside microphone (e.g., only the outside talker microphone 5), or it may have more than two.

The orientation and packaging of the inside microphone 6 may acoustically isolate it from the ambient environment (outside of the headphone housing), resulting in for example between 10 dB and 30 dB of attenuation at the signal output of the inside microphone 6 relative to that of the reference outside microphone 4, for a far-field sound source (not the wearer's mouth.) The attenuation may vary depending on the level of passive attenuation provided by the headphone housing sealing against the ear and depending on any leak ports or vents formed in the housing.

Figure 1B:
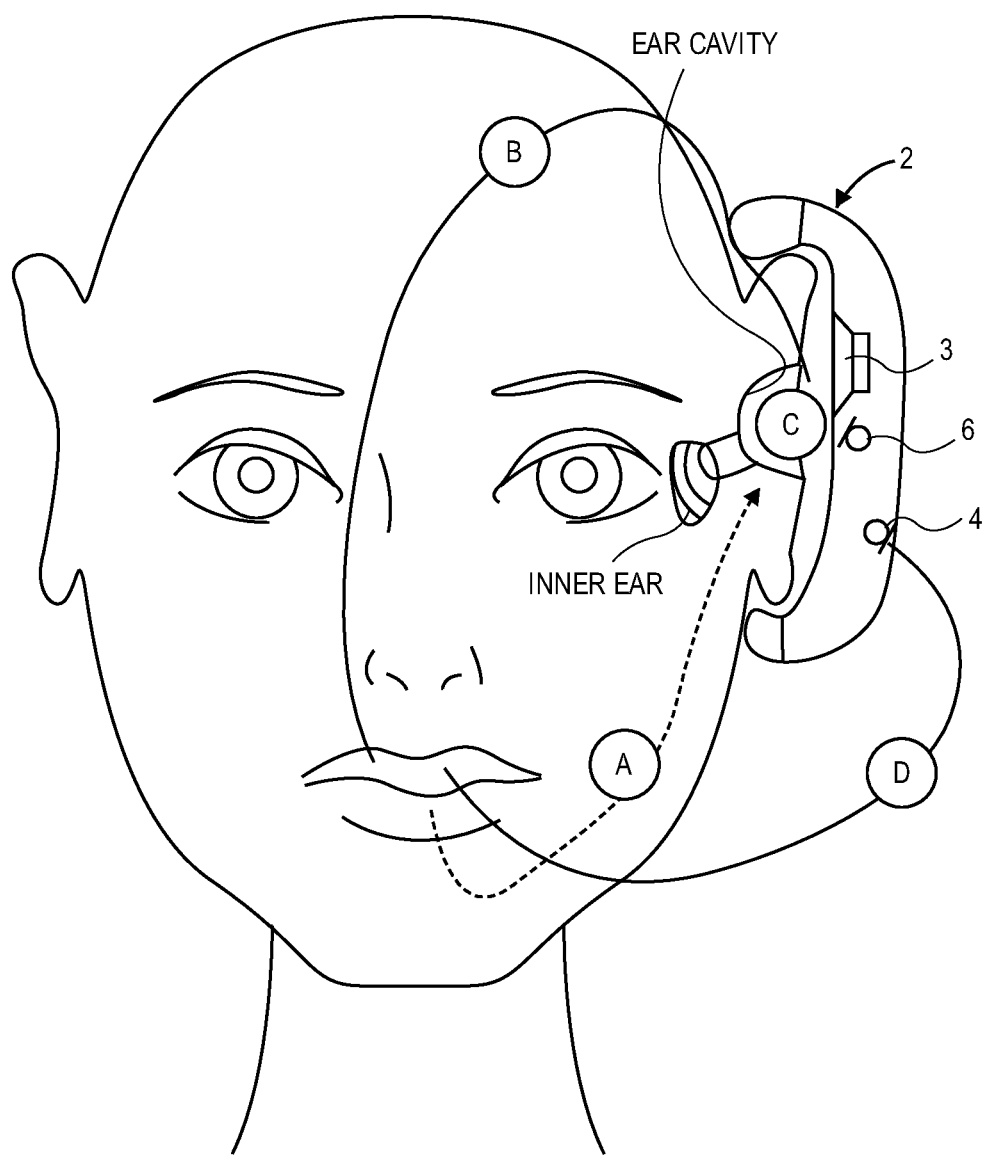
FIG. 1b depicts a user wearing an over the ear headphone.
Figure 1C:
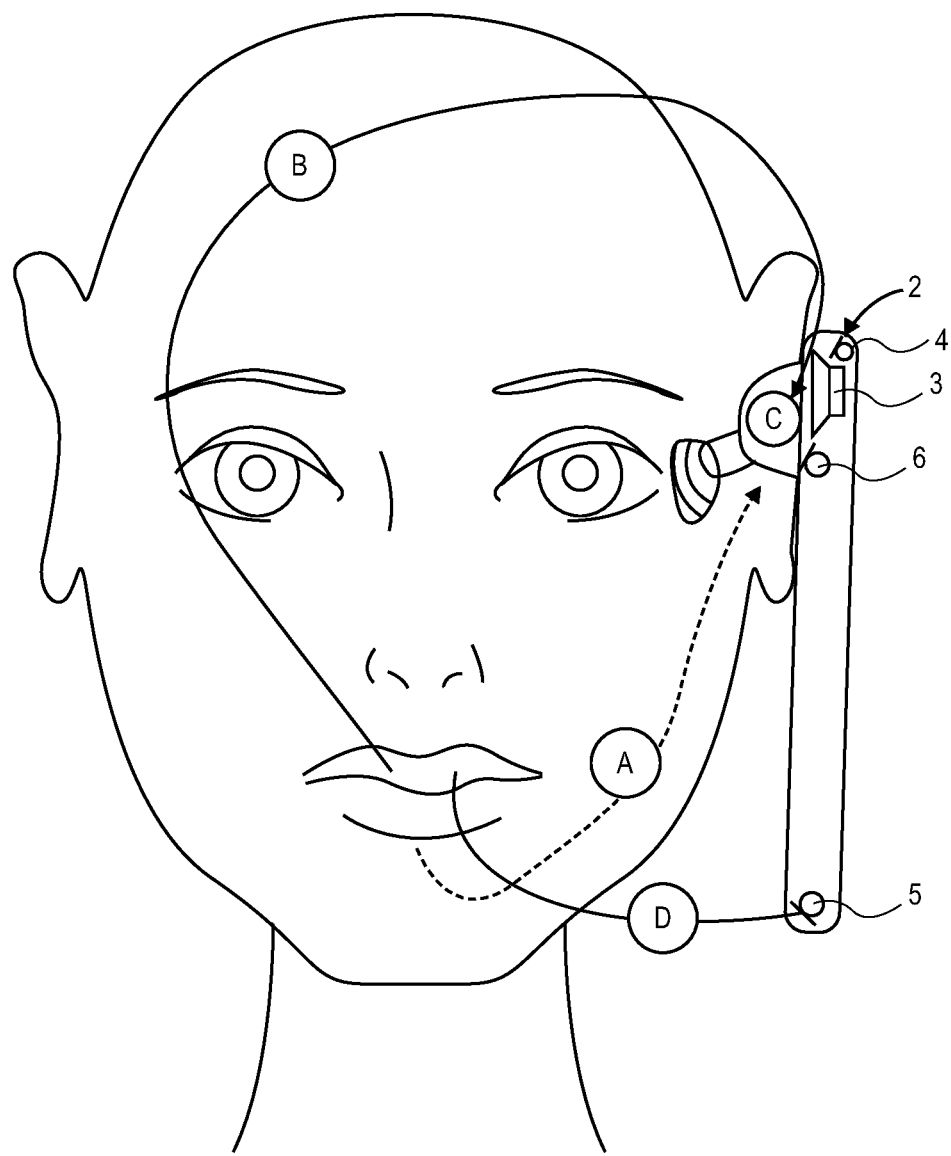
FIG. 1c depicts a user using a mobile phone handset that is against her ear.

The description and explanations given above in the context of an in-ear earbud shown in FIG. 1a, for how the inside microphone 6 senses the user's speech (sound) simultaneously through the three pathways labeled A-C, while the user's speech is also picked up by an outside microphone 4, 5 through the pathway labeled D, may also be applicable to other types of the headphone 2, such as an over the ear earphone shown in FIG. 1b, and a mobile phone handset shown in FIG. 1c.

Figure 2:
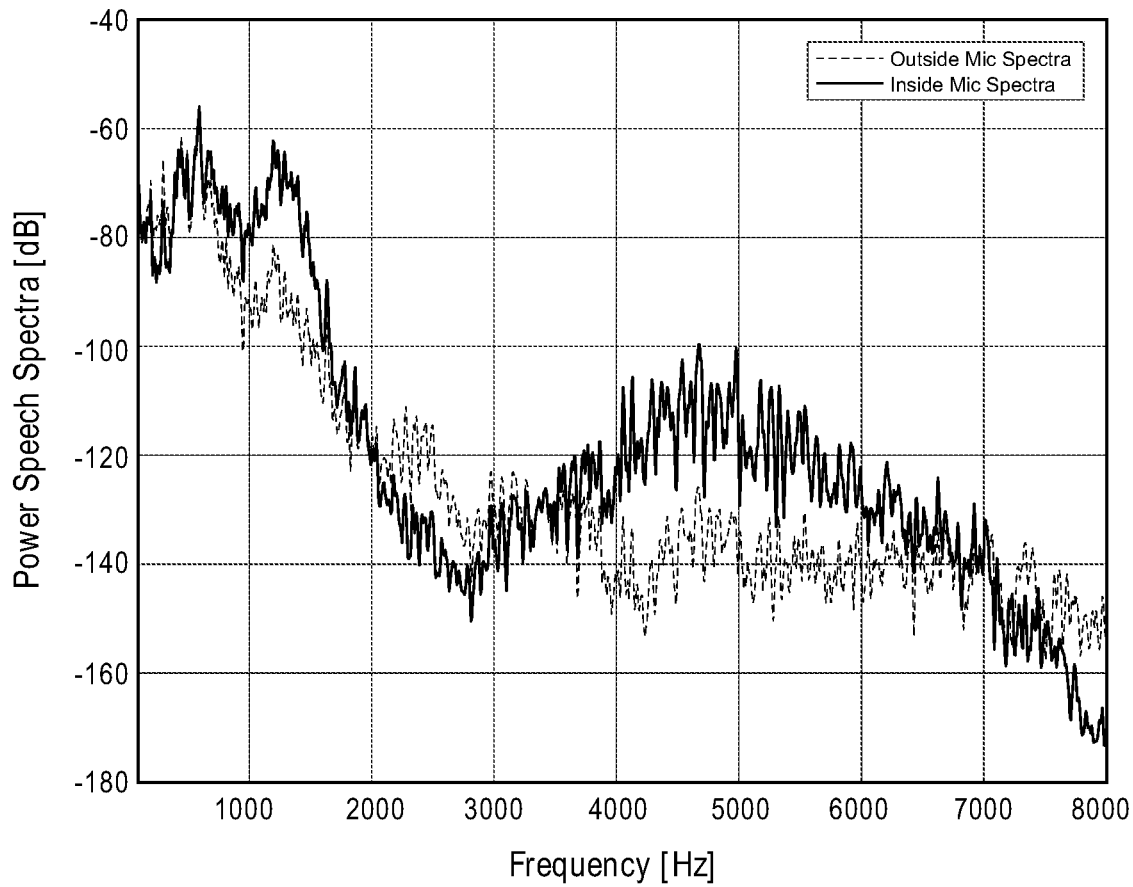
FIG. 2 is an example of power spectra of the wearer's speech as captured by the inside microphone and by the reference outside microphone of an acoustically leaky earbud-type headphone.

Turning now to FIG. 2, this figure is a plot of example power spectra of a wearer's speech as captured by the inside microphone 6 and by the reference outside microphone 4 of the headphone 2 being an acoustically leaky in-ear earbud. It is believed that the difference between the two spectra reflects the particularities of the ear cavity that has been occluded by the headphone 2 (labeled C in FIGS. 1a-1c), the particularities of acoustic speech transmission from the larynx out through the vocal and nasal tracts and past the headphone housing and into the ear (indicated by B in FIGS. 1a-1c), and by the particularities of bone conduction of the user's speech that is picked up as sound by the inside microphone (indicated by A). All three factors are wearer-dependent and are exploited in accordance with an embodiment of the invention, as described below, which uses the signal from the inside microphone 6 (rather than the reference outside microphone 4 or the talker outside microphone 5) as input to a machine-learning based speaker recognition algorithm. Note that while the microphone signal captured by the inside microphone 6 was produced in accordance with particularities of i) the ear canal of a wearer of the headphone 2, and ii) speech transmission through the skull of the wearer, the microphone signal captured by the outside microphone was not produced in accordance with those particularities, as explained below using the various pathways illustrated in FIGS. 1a-1c.

Referring back to FIGS. 1a-1c, these figures show three contributions to what may be viewed as a unique, speech-based excitation signal, which is the output signal produced by the inside microphone 6. The excitation signal is unique to the wearer of the headphone 2, because it reflects the peculiarities of the ear canal (pathway C), and transmission of the wearer's speech through her skull (pathway A), and transmission of the wearer's speech through the partially sealed headphone 2 (pathway B). In other words, the three main contributions to the speech-based excitation signal mentioned are the speech through bone conduction (pathway A), the speech sound from the vocal and nasal tracts that has been transmitted out into the ambient environment and then has leaked into the ear canal past the headphone 2 (pathway B), and the resonances of the partially occluded ear canal (pathway C.) This signal is used in accordance with the embodiments of the invention as described below, by a machine-learning based speaker recognition algorithm, to compute an identification or a verification likelihood.

The origin of this speech-based excitation signal produced by the inside microphone 6 may be modeled by mathematical relationships that represent a combination of the contributions by the pathways A, B and C. It is believed that it is the addition of the contribution from B as well as perhaps the contribution from A, to the contribution from C, which has resulted in improved performance of a speaker recognition algorithm (as reported further below.) In other words, anatomical characteristics of the wearer's ear canal cavity (length and shape), between the portion of the housing of the headphone 2 that occludes the ear and the eardrum, are incorporated into the models used by the speaker recognition algorithm, while also capturing the specific characteristics of speech bone conduction and the specific characteristics of the wearer's vocal tract and nasal tract modulations (length and shape.) Viewed another way, the difference between the wearer's speech as it is captured by the inside microphone 6 versus by an outside microphone is characterized mainly by (i) the particularities of the ear canal (ear canal resonances) and (ii) the speech sound transmissions picked up by the inside microphone that have a) been transmitted through the skull or head (bone conduction) and b) leaked past the headphone housing from outside and into the ear canal.

Figure 3:
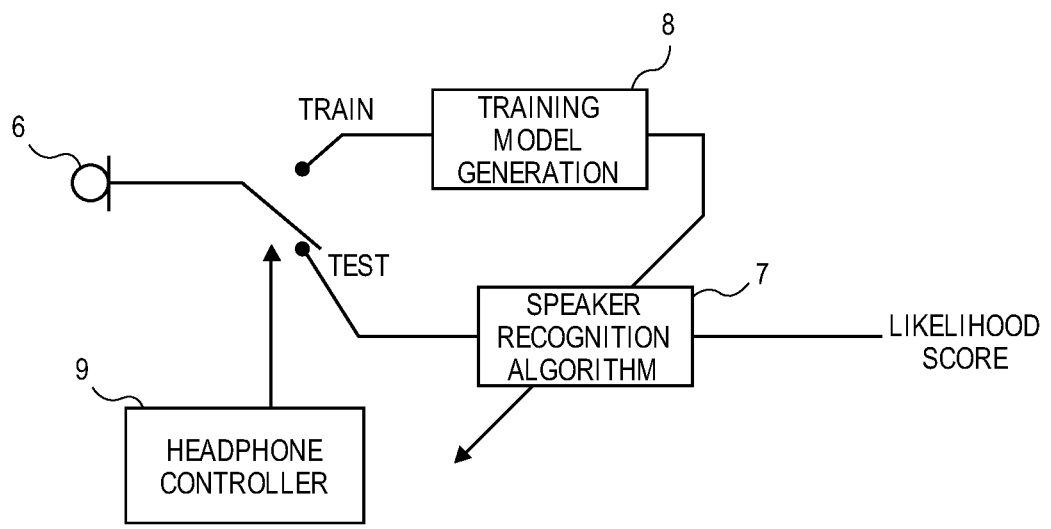
FIG. 3 shows a block diagram of a speaker recognition subsystem containing a training or enrollment phase and a test or recognition phase.

Turning now to FIG. 3, a block diagram of electronic hardware components of a machine-learning based speaker recognition subsystem is shown that uses as its input the speech-based excitation signal produced by the inside microphone 6. The components shown may be implemented as a programmed data processor that performs the digital signal processing operations of a method, which may be described as follows. The subsystem and the operations described below may begin with receiving (e.g., buffering within memory) a microphone signal that is produced by the inside microphone 6 (an acoustic microphone) of the headphone 2 which is worn by a user (wearer). A headphone controller 9 performs high-level management of the speaker recognition method, and routes the microphone signal in digital form, initially to a training phase or process (training model generation 8). The microphone signal produced by the inside microphone 6 is received while a particular user (wearing the headphone 2) is speaking. Note here that the headphone 2 may also be producing a further microphone signal by one or more outside microphones 4, 5, where all of these microphone signals may be synchronized to capture sound over the same time interval (simultaneous or contemporaneous sound capture).

The training model generation 8 serves to train or tune a pre-defined, mathematical speaker model in a way that maximizes the likelihood of a speaker recognition algorithm 7 (when using that model for) correctly recognizing several speech samples (utterances) in the signal from the inside microphone 6 as coming from the user whose speech production and ear cavity characteristics are reflected in that model. In one embodiment, the mathematical model represents a set of parameters that capture the characteristics of vocal and nasal tracts, ear canal, and speech transmission through both the skull and as leakage past the headphone housing, all of which are responsible for producing the acoustic signal that is picked up by the inside microphone 6. All of these characteristics may be exhibited to some extent in the microphone signal from the inside microphone 6, and it is the job of the training model generation 8 to generate the parameters of the model to correctly reflect as much of these characteristics as possible.

For the particular speaker recognition (identification or verification) method called Maximum Likelihood—Gaussian Mixture Model (ML-GMM) the model containing M mixtures for a given user or speaker can be described by the equations below $$P(x|\lambda) = \sum_{i=1}^{M} w_i * b_i(x)$$

where x represents the input speech feature vector, $$\lambda_i = (w_i, \mu_i, \sigma_i)$$

represents the model parameters for each mixture i=1, ..., M, $w_i$ represents the weight of mixture i, $b_i(x)$, represents the probability distribution function (pdf) for the mixture i of the model, defined as $$b_i(x) = \frac{1}{(2*\pi)^{\frac{D}{2}} * |\sigma_i|^{1/2}} * \exp\left[-\frac{1}{2} * (x-\mu_i)^T * (\sigma_i)^{-1} * (x-\mu_i)\right]$$

where D is the length of the feature vector, with the condition that the sum of the weights $w_i$ from i=1 to M equals 1, and the $\mu_i$ and $\sigma_i$ represent the mean and variance of the mixture i of the GMM model.

It should be noted that, in one embodiment, the signals produced by the outside microphones are not used as an input or excitation signal, to train the speaker recognition algorithm 7 (tune the parameters of its models.) In addition, none of the outside microphone signals are used as a further input to the algorithm 7, when processing the microphone signal from the inside microphone 6 to produce speaker identification or speaker verification likelihood scores. Further, in one embodiment, none of the outside microphone signals are used to mathematically adjust the signal from the inside microphone 6 (before using the latter as an input to train the algorithm 7.) In contrast, the signal from the outside talker microphone 5 or from the outside reference microphone 4 could be used as input for training and test by an automatic speech recognition (ASR) algorithm, to recognize (convert into text) the user's speech. Although not shown in the figures, such an ASR algorithm may be implemented by a programmed processor that is integrated in the headphone housing, or that is integrated in an external audio device (such as a smartphone or a tablet computer, not shown) to which the headphone 2 may be connected as an accessory.

Once the training model generation 8 has completed its calculation or tuning of the model, based on the signal from the inside microphone 6 while a particular user, such as a registered owner of the headphone 2, is speaking, the trained speaker recognition algorithm 7 (as configured by the recently computed model) tests another sample of the signal from the inside microphone 6, as input to the algorithm 7 in the test phase. In other words, the speaker recognition algorithm 7 now tests a new utterance or phrase that has been captured in the signal from the inside microphone 6, by employing the trained user model to produce a speaker identification likelihood score or a speaker verification likelihood score for the new sample. Note here that "speaker identification" may generate for a given sample likelihoods that the sample was produced by each of several users, respectively, whose models had been created. In contrast, "speaker verification" may generate for a given sample a single likelihood that the sample was produced by a particular user, e.g., the registered owner of the headphone 2, in order to verify the identity of a user. As pointed out above, in one embodiment, signals from the outside microphones are not used as inputs to the training model generation 8 or to the speaker recognition algorithm 7, to train the models and to produce the identification or verification likelihood scores.

The speaker recognition algorithm 7 may be neural-network based (e.g., a deep neural network or other artificial neural network), or it may be based on a maximum likelihood model technique such as one that is based on a Gaussian Mixture Model (GMM). These are algorithms that may produce multiple models for multiple input utterances (samples), respectively, during the training phase (training model generation 8), and then compute the speaker identification or the speaker verification likelihood scores using one of the models for a new input utterance (during a test phase.) As suggested above, the speaker recognition algorithm 7 may be text dependent, or it may be text independent.

Figure 4:
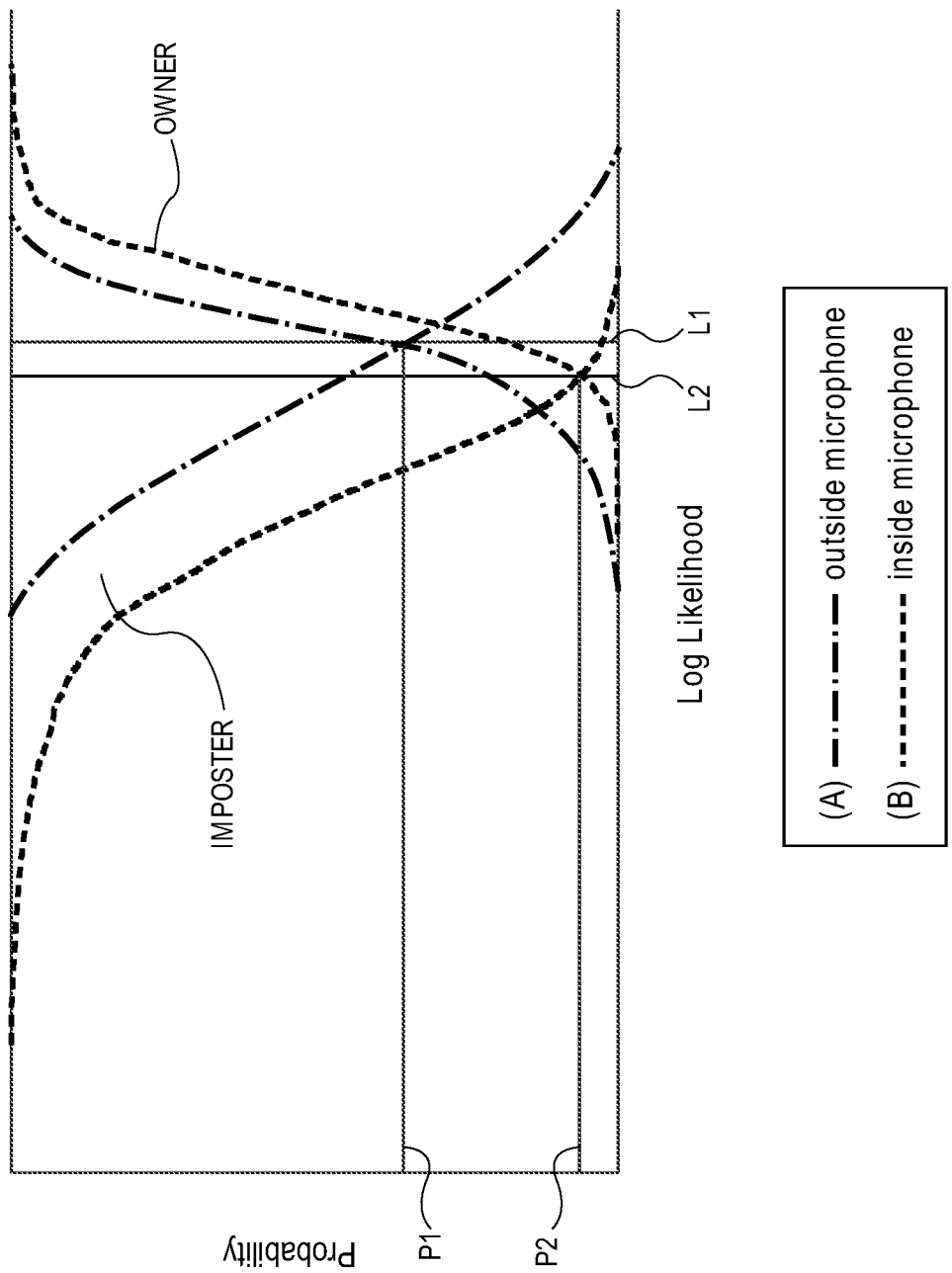
FIG. 4 shows a comparison of speaker recognition results as EER plots, that have been obtained using maximum likelihood and Gaussian mixture models, for speech signals from the outside microphone and from the inside microphone.

FIG. 4 shows two pairs of equal error rate (EER) plots for speaker verification, one pair that has been generated using the outside microphone 4 and another that has been generated using the inside microphone 6 (recorded simultaneously with outside microphone) of an earbud-type headphone 2—see FIG. 1a. The x-axis gives a speaker verification likelihood score computed by the speaker recognition algorithm 7 during its test phase, while the y-axis gives the cumulative probability of various utterances from users (owners) and imposters. For the same speech sample, verification likelihood scores (and their associated probabilities) were computed using the signal from the inside microphone 6 (to the exclusion of outside microphone signals), and using the simultaneously available signal from the outside microphone 4 (to the exclusion of the inside microphone signal.) The speaker verification scores were computed by a Maximum Likelihood-GMM (ML-GMM) algorithm, as an example of the speaker recognition/verification algorithm 7. The same ML-GMM algorithm was trained with approximately ten seconds of input data (input utterances from four users considered to be "registered owners" of the headphone 2), in one instance taken from the outside microphone 4 of the headphone 2, and in another instance taken from the inside microphone 6.

As seen FIG. 4, for the outside microphone 4, the two plots that have the same dash-dotted line type (where one was computed for imposters speaking and another for registered owners speaking) intersect at a likelihood L1 which gives an equal error rate P1. The intersection likelihood may also be referred to as the "likelihood threshold" L1. In contrast, for the inside microphone 6, the two plots (that have the dotted line type, where one was computed when the imposters were speaking and another when the registered owners were speaking) intersect at a likelihood threshold L2 which gives a much lower equal error rate P2. These plots are from combined data taken from multiple users and multiple imposters.

The plots in FIG. 4 may be interpreted as follows: If the log likelihood score for a new utterance, computed using a claimed, specific user model, is above the likelihood threshold (L1 or L2) then the speaker recognition algorithm 7 decides that the new utterance was produced by the user whose specific user model was claimed (the registered owner), otherwise that it was produced by an imposter. Since the intersection of the inside microphone plots (at L2) occurs at a lower probability P2 than the probability P1 of the intersection of the outside microphone plots (at L1), the decisions (made by the speaker recognition algorithm 7) are more accurate when using the inside microphone 6 (and the threshold L2.) This may be due to the fact that as explained above the inside microphone 6 captures additional speaker characteristics (bone conduction of speech) and ear characteristics (ear canal), as compared with any of the outside microphones 4, 5.

Figure 5:
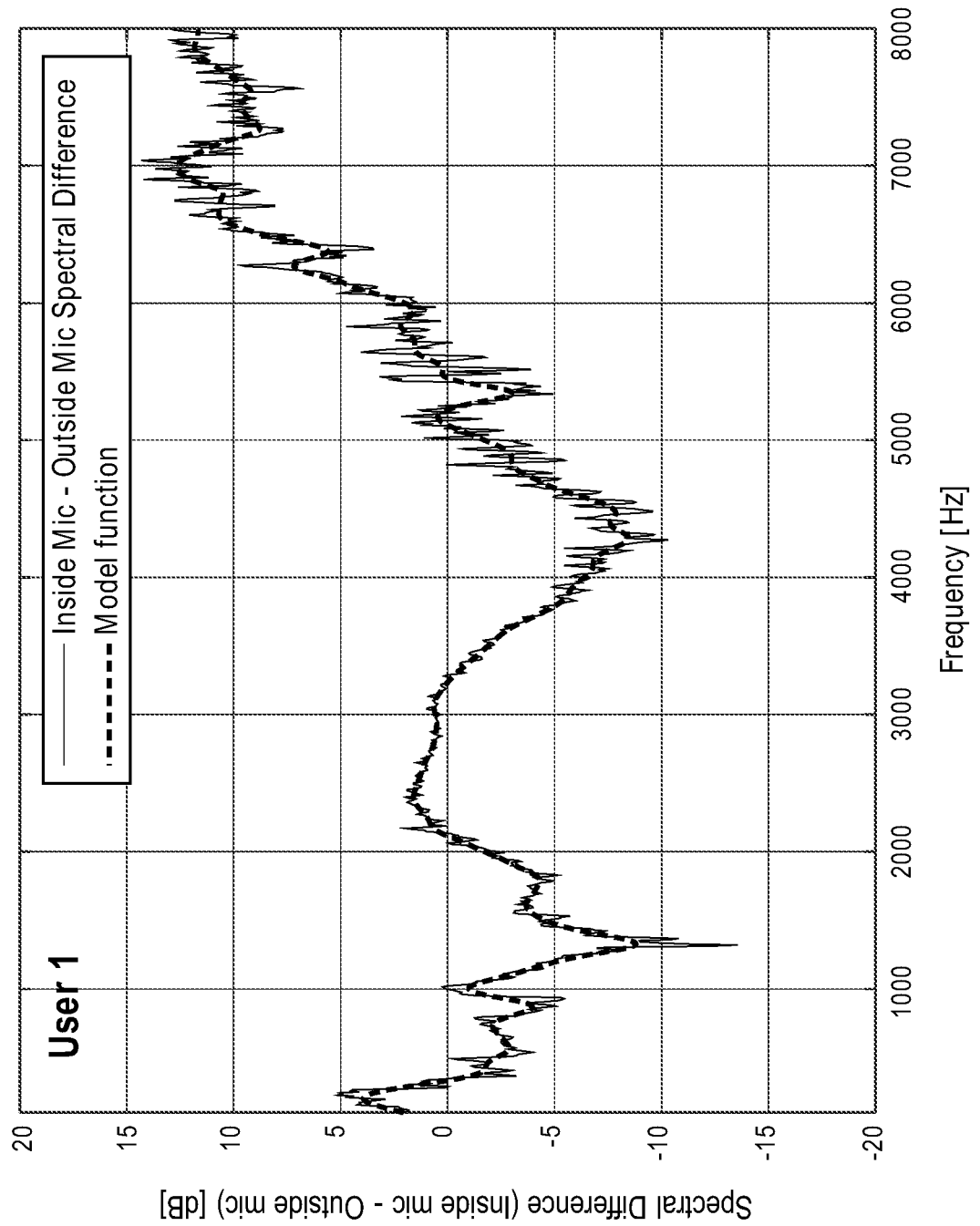
FIG. 5 is a plot of the spectral ratio between the signals picked up by the inside microphone and the outside microphone, for speech by a first user.
Figure 6:
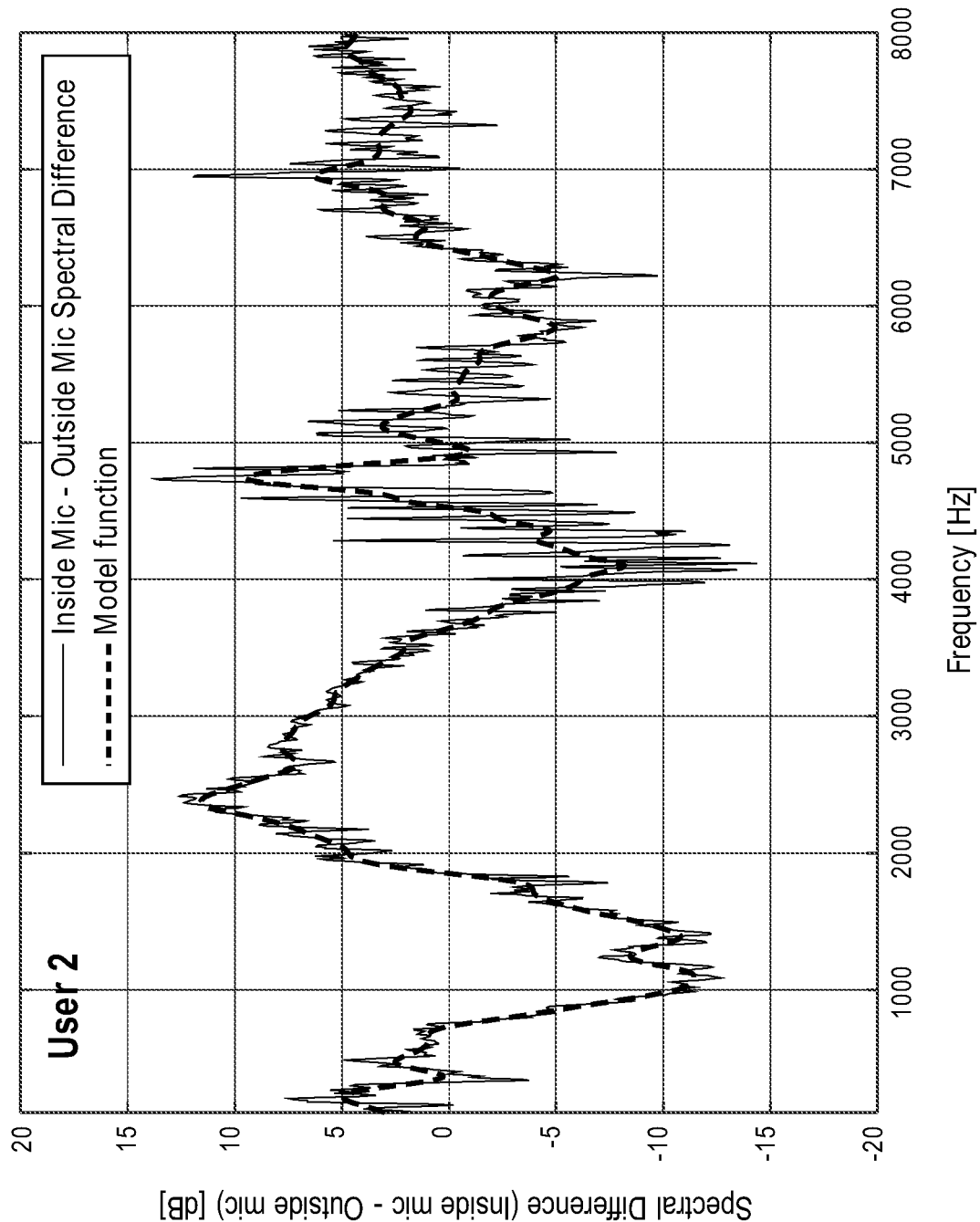
FIG. 6 is a plot of the spectral ratio between the signals picked up by the inside microphone and the outside microphone, for speech by a second user.

Turning now to FIG. 5 and FIG. 6, these are plots of speech spectral ratios in dB between the signals from the inside microphone 6 and an outside microphone (e.g., the reference outside microphone 4, the talker outside microphone 5) from two different users speaking the same utterance. The spectral ratio plots are overlaid with model functions (of an example speaker recognition model computed for each user by smoothing the ratio plots in frequency domain.) It can be seen that the spectral ratio curves (and the associated model functions) are quite different between the two users, which supports the increased discriminability due to adding the information from the inside microphone as described above for speaker recognition. The plots may also provide support for the concept of using the spectral ratio by itself as an input to a speaker recognition algorithm, as described below in accordance with another embodiment of the invention.

A second embodiment of the invention is a method for speaker recognition that uses a ratio, in frequency domain, of i) the user's speech as picked up by the inside microphone 6 and ii) the user's speech as picked up by the simultaneously recorded outside microphone (e.g., reference outside microphone 4, or talker outside microphone 5) of the headphone 2 that is worn by the user—see FIGS. 1a-1c. Thus, in contrast to the first embodiment described above where the outside microphone signals are not used to produce a speech input feature of the speaker recognition algorithm 7, in the second embodiment the method generates a feature vector that contains the difference (delta) between logarithms of the powers in the inside and outside microphone signals, for example as the logarithm of the ratio of the power spectra of the user's speech as picked up by the inside microphone and by the outside microphone. Each component of such a vector may be a power ratio computed at a respective frequency bin. To do so, each of the two microphone signals may be first transformed from time domain to frequency domain, using a Fast Fourier Transform, FFT (e.g., Short Term Fourier Transform) or other methods such as filter bank analysis. Then, the power spectra of the inside microphone signal is divided by the power spectra of the outside microphone signal, on a per frequency bin basis. Then the average power spectra over the entire utterance from the inside microphone is divided by the average power spectra of the outside microphone. A smoothing is then applied across frequency bins to result in the raw form of the input feature vector for the speaker recognition (identification or verification) algorithm. The smoothed raw feature vector is computed as shown in the equation below $$FV_{RAW} = 10 * \log_{10}\left[\frac{PS_i}{PS_o}\right]$$

where PSi is the average speech power spectra from the inside microphone, PSo is the average speech power spectra from the outside microphone. In one embodiment, a subsequent process is applied to the raw form of the feature vector, for dimensionality reduction at the input to the speaker recognition algorithm. Such a process may employ a Principal Component Analysis (PCA) technique, a Linear Discriminant Analysis (LDA), and the like. In such cases the size of the reduced-dimensionality feature vector is NPCA<NFFT or NLDA<NFFT, where NFFT is the size of the FFT. Either the raw feature vector or the reduced dimensionality feature vector can be used as the input for the training phase of the desired speaker recognition algorithm, and subsequently during the test phase. Thus, the power ratio-based feature vectors can be used to train the speaker recognition algorithm with samples of a particular user's speech, and then be computed for new speech samples which are tested by the trained algorithm (to compute the identification or verification likelihood scores.)

A method in accordance with the second embodiment described above may be as follows. A speaker recognition algorithm is trained with a sample of a log power difference between the inside and the outside microphone signals, as an input to the algorithm, wherein the algorithm is instructed to consider the sample as representing an utterance or phrase spoken by the particular user. Thereafter, the trained speaker recognition algorithm can test another sample of the difference between the inside and the outside microphone signals, as input to the algorithm, that contains an utterance or phrase, wherein the testing produces a speaker identification likelihood score or a speaker verification likelihood score for said another sample. As explained above, the difference between log power of the signals from the inside and outside microphone may include a feature vector that contains a ratio of the power spectra of the inside and outside microphone signals, wherein each component of the feature vector includes a power ratio computed at a respective frequency bin. A dimensionality reduction process may also be applied to the feature vector, for dimensionality reduction at the input to the speaker recognition algorithm.

The embodiments of the invention described above may be implemented as part of a headphone. A headphone housing has integrated therein an inside acoustic microphone, an outside acoustic microphone, a processor and memory having stored therein instructions which when executed by the processor and while a particular user is speaking while wearing the headphone, receive a first microphone signal produced by the inside acoustic microphone while a second microphone signal is produced by the outside acoustic microphone. The programmed processor trains the speaker recognition algorithm by tuning a pre-defined mathematical model, in accordance with a number of samples of the first microphone signal, and wherein the tuned model is assigned to the particular user. Thereafter, programmed processor can test another sample of the first microphone signal, as input to the speaker recognition algorithm as configured with the tuned model that is assigned to the particular user, wherein said another sample contains an utterance or phrase, and the testing produces a speaker identification likelihood score or a speaker verification likelihood score for said another sample. All of the variations described above for the first method in which the second microphone (produced by the outside acoustic microphone) is not used as an input to the speaker recognition algorithm, may be implemented in such a headphone.

A headphone could alternatively be configured to perform the second speaker recognition method described above, in which both inside and outside acoustic microphones are used. In that instance, the headphone housing has integrated therein an inside acoustic microphone, an outside acoustic microphone, a processor and memory having stored therein instructions which when executed by the processor and while a particular user is speaking while wearing the headphone, receive a first microphone signal produced by the inside acoustic microphone while a second microphone signal is produced by the outside acoustic microphone. The programmed processor trains a speaker recognition algorithm by tuning a pre-defined mathematical model in accordance with a number of samples of a difference between the inside and the outside microphone signals, wherein the tuned model is assigned to the particular user. Thereafter, another sample of the difference in log power between the inside and the outside microphone signals is tested, by the speaker recognition algorithm as configured with the tuned model that is assigned to the particular user, wherein said another sample contains an utterance or phrase and the testing produces a speaker identification likelihood score or a speaker verification likelihood score for said another sample. All of the variations described above for the second method may be implemented in such a headphone.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

What is claimed is:

1. A method for speaker recognition used with a headphone, the method comprising:
    obtaining a first microphone signal, produced by an inside microphone, and a second microphone signal, produced by an outside microphone, wherein the first microphone signal and the second microphone signal contain speech of a user, and the inside microphone and the outside microphone are integrated within the headphone;
    identifying or verifying the user based on the speech of the user using the first microphone signal, and not the second microphone signal, as input to a speaker recognition algorithm; and
    recognizing the speech of the user using the second microphone signal as input to a speech recognition algorithm.

2. The method of claim 1 wherein the speaker recognition algorithm is trained with a first sample of the first microphone signal and tested with a second sample of the first microphone signal.

3. The method of claim 1 wherein the outside microphone is one of a plurality of outside microphones.

4. The method of claim 3 wherein none of the plurality of outside microphones of the headphone is used as an input to train the speaker recognition algorithm.

5. The method of claim 1 wherein the first microphone signal exhibits i) characteristics of vocal and nasal tracts, ii) characteristics of an ear canal, and iii) speech bone conduction transmission characteristics, of a wearer of the headphone, and the second microphone signal exhibits i), not ii) and not iii).

6. The method of claim 1 wherein the first microphone signal was produced in accordance with particularities of i) vocal and nasal tract characteristics ii) an ear canal of a wearer of the headphone and iii) speech transmission through a skull of the wearer, but the second microphone signal was not produced in accordance with the second and third particularities.

7. The method of claim 1 wherein the speaker recognition algorithm is neural-network based.

8. The method of claim 1 wherein the speaker recognition algorithm is based on a Gaussian Mixture Model, GMM, technique or other maximum likelihood model technique, that produces a plurality of models for a plurality of input utterances during a training phase, and then computes a speaker identification likelihood score or a speaker verification likelihood score using one of the models.

9. The method of claim 1 wherein the speaker recognition algorithm is text dependent.

10. The method of claim 1 wherein the speaker recognition algorithm is text independent.

11. The method of claim 1, wherein the headphone is an in-ear earbud.

12. The method of claim 1, wherein the headphone is an over the ear earphone.

13. The method of claim 1, wherein the headphone is a mobile phone handset.

14. A headphone comprising:
a headphone housing having integrated therein an inside microphone, and one or more outside microphones; and
a processor and memory having stored therein instructions which when executed by the processor, performs the following
obtaining a first microphone signal, produced by the inside microphone, and a second microphone signal, produced by one of the one or more outside microphones, the first microphone signal and the second microphone signal containing speech of a user,
identifying or verifying the user based on the speech of the user using only the first microphone signal as input to a speaker recognition algorithm, and
recognizing the speech of the user using the second microphone signal as input to a speech recognition algorithm.

15. The headphone of claim 14 wherein the inside microphone is positioned and oriented so that its primary acoustic input port is directly open to an ear cavity of a wearer of the headphone while the ear cavity is partially occluded by the housing of the headphone, and at least one of the one or more outside microphones is positioned and oriented so that its primary acoustic input port is not directly open to the partially occluded ear cavity.

16. The headphone of claim 14 wherein the speaker recognition algorithm is trained with a first sample of the first microphone signal and tested with a second sample of the first microphone signal.

17. The headphone of claim 14 wherein none of the plurality of outside microphones of the headphone are used as an input to train the speaker recognition algorithm.

18. The headphone of claim 14 wherein the first microphone signal exhibits i) characteristics of vocal and nasal tracts, ii) characteristics of an ear canal, and iii) speech bone conduction transmission characteristics, of a wearer of the headphone, and the second microphone signal exhibits i), not ii) and not iii).

19. The headphone of claim 14 wherein the first microphone signal was produced in accordance with particularities of i) vocal and nasal tract characteristics ii) an ear canal of a wearer of the headphone and iii) speech transmission through a skull of the wearer, but the second microphone signal was not produced in accordance with the second and third particularities.

20. The headphone of claim 14 wherein the speaker recognition algorithm is neural-network based.

21. The headphone of claim 14 wherein the speaker recognition algorithm is based on a Gaussian Mixture Model, GMM, technique or other maximum likelihood model technique, that produces a plurality of models for a plurality of input utterances during a training phase, and then computes a speaker identification likelihood score or the speaker verification likelihood score using one of the models.

22. The headphone of claim 14 wherein the speaker recognition algorithm is text dependent.

23. The headphone of claim 14, wherein the headphone is an in-ear earbud.

24. The headphone of claim 14, wherein the headphone is an over the ear earphone.

25. The headphone of claim 14, wherein the headphone is a mobile phone handset.

26. A smartphone or tablet computer having one or more processors configured to perform the following:
obtaining a first microphone signal, produced by an inside microphone of a headphone, and a second microphone signal, produced by one of one or more outside microphones of the headphone, the first microphone signal and the second microphone signal containing speech of a user;
identifying or verifying the user based on the speech of the user using only the first microphone signal as input to a speaker recognition algorithm; and
recognizing the speech of the user using the second microphone signal as input to a speech recognition algorithm.

27. The smartphone or tablet computer of claim 26 wherein the speaker recognition algorithm is trained with a first sample of the first microphone signal and tested with a second sample of the first microphone signal.

28. The smartphone or tablet computer of claim 26 wherein none of the plurality of outside microphones of the headphone are used as an input to train the speaker recognition algorithm.

29. The smartphone or tablet computer of claim 26, wherein the headphone is an in-ear earbud.

30. The smartphone or tablet computer of claim 26, wherein the headphone is an over the ear earphone.

31. The smartphone or tablet computer of claim 26, wherein the headphone is a mobile phone handset.

* * * * *